US011923637B2

(12) United States Patent
Bischoff et al.

(10) Patent No.: US 11,923,637 B2
(45) Date of Patent: Mar. 5, 2024

(54) ELECTRICAL CONNECTOR WITH MINIMAL TRANSFER OF TORSIONAL LOAD

(71) Applicant: TE Connectivity Germany GmbH, Bensheim (DE)

(72) Inventors: Daniel Bischoff, Bensheim (DE); Daniel Domke, Bensheim (DE); Bjoern Schiemer, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 187 days.

(21) Appl. No.: 17/463,674

(22) Filed: Sep. 1, 2021

(65) Prior Publication Data

US 2022/0109270 A1 Apr. 7, 2022

(30) Foreign Application Priority Data

Oct. 1, 2020 (EP) .................................... 20199634

(51) Int. Cl.
*H01R 13/42* (2006.01)
*H01R 13/52* (2006.01)
*H01R 13/627* (2006.01)

(52) U.S. Cl.
CPC ......... *H01R 13/6271* (2013.01); *H01R 13/42* (2013.01); *H01R 13/5219* (2013.01)

(58) Field of Classification Search
CPC .. H01R 13/627; H01R 13/42; H01R 13/5219; H01R 13/44
See application file for complete search history.

(56) References Cited

U.S. PATENT DOCUMENTS

| | | | | |
|---|---|---|---|---|
| 6,146,211 | A * | 11/2000 | Okamoto | H01R 13/44 439/825 |
| 7,980,894 | B1 | 7/2011 | Hall et al. | |
| 8,298,022 | B2 * | 10/2012 | Tsuruta | H01R 13/4365 439/948 |
| 8,734,191 | B2 * | 5/2014 | Zhao | H01R 13/6456 439/701 |
| 9,647,372 | B2 * | 5/2017 | Eckel | H01R 24/66 |
| 10,205,274 | B2 * | 2/2019 | Loncar | H01R 13/621 |
| 10,381,752 | B2 * | 8/2019 | Kaehny | H01M 50/543 |
| 10,439,339 | B2 * | 10/2019 | Motohashi | H01R 24/38 |
| 2001/0055908 | A1 | 12/2001 | Bruce | |
| 2012/0040557 | A1 | 2/2012 | Marsh | |
| 2018/0366887 | A1 | 12/2018 | Motohashi et al. | |

FOREIGN PATENT DOCUMENTS

| | | | |
|---|---|---|---|
| CN | 110197965 | A | 9/2019 |
| GB | 2064236 | A | 6/1981 |

OTHER PUBLICATIONS

Extended European Search Report, European Application No. 20199634. 5-1201, dated Feb. 11, 2021.

* cited by examiner

*Primary Examiner* — Tho D Ta
(74) *Attorney, Agent, or Firm* — Barley Snyder

(57) ABSTRACT

An electrical connector configured to be mated to a mating connector includes a housing assembly and a core assembly held rotatably within the housing assembly. The core assembly includes a contact assembly having a contact configured to electrically contact a mating contact of the mating connector, a finger protection assembly configured to at least partially cover the contact assembly, and a cable retention assembly configured to be attached onto an electrical cable.

18 Claims, 6 Drawing Sheets

ELECTRICAL CONNECTOR WITH MINIMAL TRANSFER OF TORSIONAL LOAD

CROSS-REFERENCE TO RELATED APPLICATIONS

This application claims the benefit of the filing date under 35 U.S.C. § 119(a)-(d) of European Patent Application No. 20199634.5, filed on Oct. 1, 2020.

FIELD OF THE INVENTION

The present invention relates to an electrical connector and, more particularly, to an electrical connector having a minimal transfer of torsional load.

BACKGROUND

In applications involving the transmission of electrical power and/or signals, spaced-apart technical units may be electrically connected by an electrical cable in a separable fashion, using electrical connectors. When establishing such an electrical connection, the electrical connectors are often handled manually or by robots, in order to route the electrical cable along an available cable path. During said handling and routing, the electrical connector and electrical cable may be subjected to high forces. This is in particular the case in high-voltage and/or high-current applications where electrical cables are often thick and stiff. These high forces may damage the electrical connector, the electrical cable and/or the connection between the electrical cable and the electrical connector. Furthermore, the thickness and stiffness of the electrical cable may complicate the handling when establishing the electrical connection.

SUMMARY

An electrical connector configured to be mated to a mating connector includes a housing assembly and a core assembly held rotatably within the housing assembly. The core assembly includes a contact assembly having a contact configured to electrically contact a mating contact of the mating connector, a finger protection assembly configured to at least partially cover the contact assembly, and a cable retention assembly configured to be attached onto an electrical cable.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
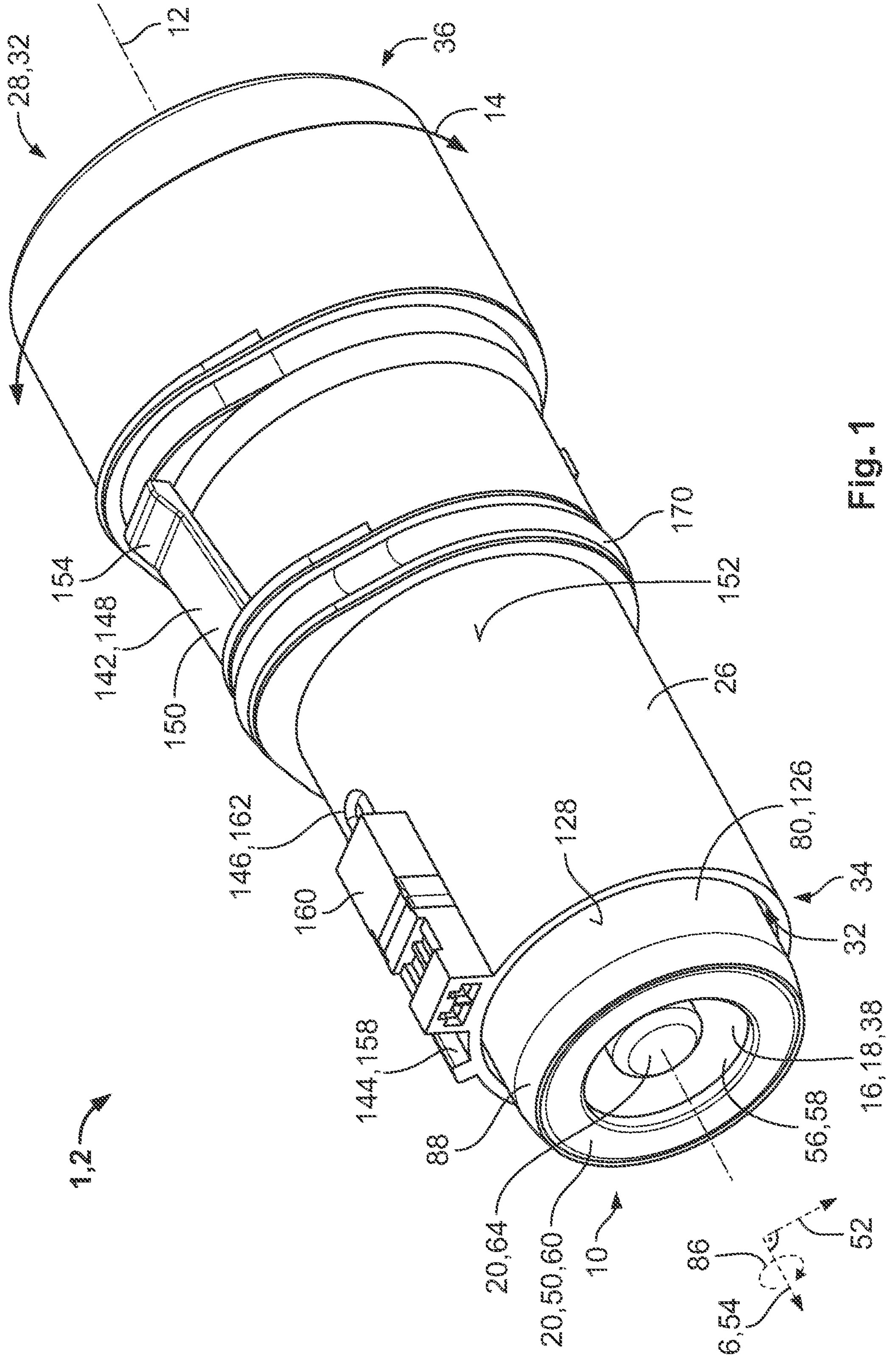
FIG. 1 is a perspective view of an electrical connector according to an embodiment.

In the following, exemplary embodiments of the invention are described with reference to the drawings. The embodiments shown and described are for explanatory purposes only. The combination of features shown in the embodiments may be changed according to the description herein. For example, a feature which is not shown in an embodiment but described herein may be added if the technical effect associated with this feature is beneficial to a particular application. Vice versa, a feature shown as part of an embodiment may be omitted as described if the technical effect associated with this feature is not needed in a particular application. In the drawings, elements that correspond to each other with respect to function and/or structure have been provided with the same reference numeral.

In the following, the structure of possible embodiments of an electrical connector 1 according to the present invention is explained with reference to the exemplary embodiments shown in FIGS. 1 to 6.

FIG. 1 shows a perspective view of the electrical connector 1 according to one possible embodiment of the present disclosure. The electrical connector 1 may, in particular, be a high-voltage connector 2 e.g., for automotive applications. The applicability of the present invention however is not limited to high-voltage automotive applications but may also extend to other applications from the field of electrical engineering. The electrical connector 1 is configured to be mated to a mating connector 4 (see FIG. 4), along a mating direction 6.

Figure 2:
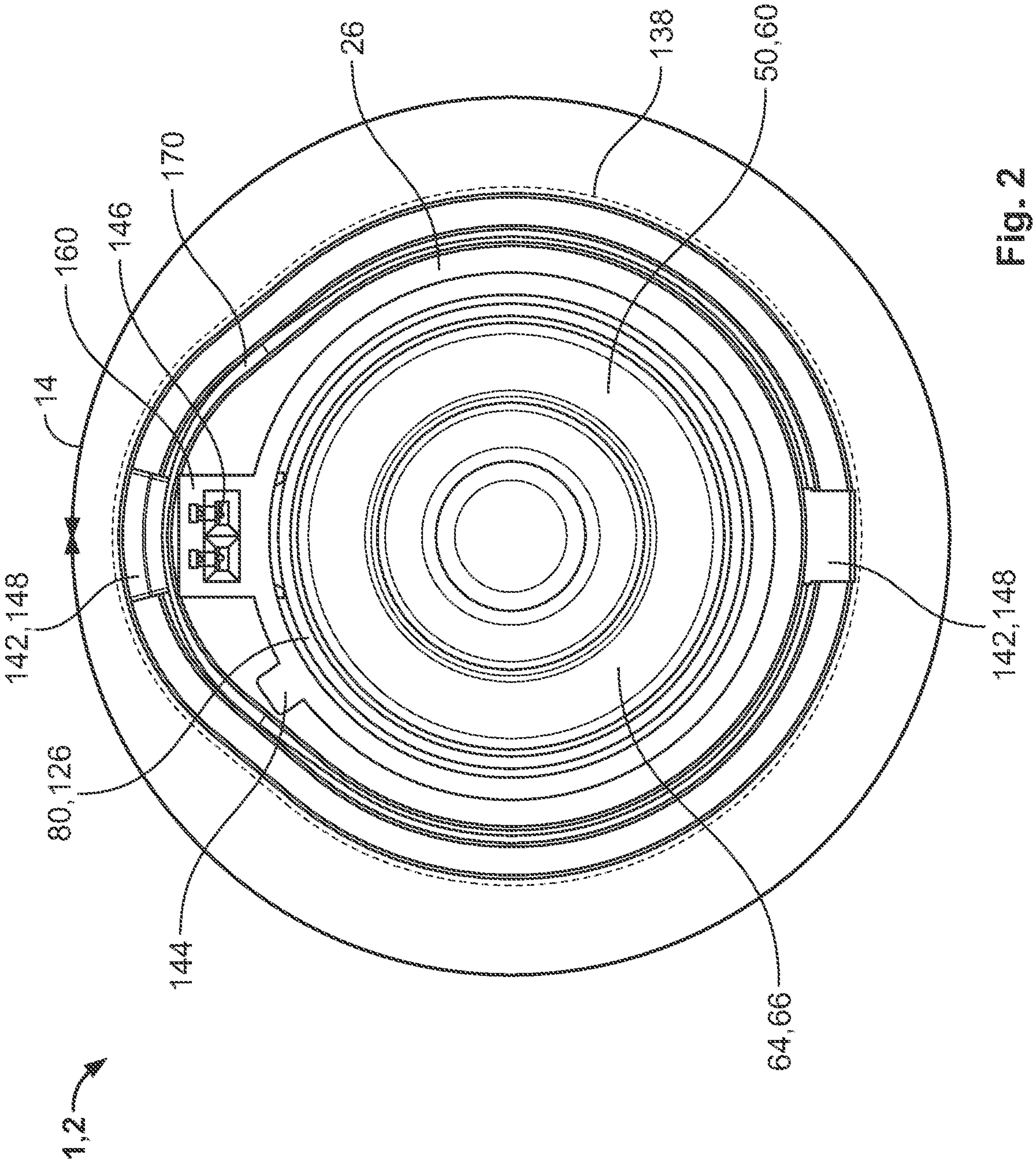
FIG. 2 is a front view of the electrical connector of FIG. 1.

As can be seen in FIG. 1, the electrical connector 1 comprises a housing assembly 8 and a core assembly 10, wherein the core assembly 10 is held rotatably within the housing assembly 8. In an embodiment, the core assembly 10 is rotatable with respect to the housing assembly 8 about a rotational axis 12 parallel to said mating direction 6. Further, the core assembly 10 may be rotatable with respect to the housing assembly 8 up to an angle of 360° or any multiple of 360° with an arbitrary integer. In particular, the core assembly 10 may be held fully and/or unrestrictedly rotatably within the housing assembly 8. This is indicated in FIGS. 1 and 2 with arrows 14.

Each of the housing assembly 8 and core assembly 10 may be a separate, unitary module. In an embodiment, both the housing assembly 8 and the core assembly 10 are unitary modules, which are respectively pre-assembled and readily mountable onto each other. In particular, the core assembly 10 may be insertable into the housing assembly 8 along an assembly direction 106, which is parallel to the mating direction 6. This embodiment results in less effort and time required during assembly of the electrical connector 1. Further, the maintainability of the electrical connector 1 is improved, as the housing assembly 8 or core assembly 10 can easily be replaced in case of damage or failure. Alternatively, just the core assembly 10 may be a pre-assembled unitary module, while the housing assembly 8 is only assembled after insertion of the core assembly 10 along the assembly direction 106. This will be described in further detail below.

As will be described with reference to FIG. 3 below, the core assembly 10 comprises a contact assembly 16 with a contact 18 configured to electrically contact a mating contact of the mating connector 4, a finger protection assembly 20 configured to at least partially cover the contact assembly 16, and a cable retention assembly 22 configured to be attached to an electrical cable 24.

The housing assembly 8 may comprise a connector housing 26, through which a receptacle 28 extends along the mating direction 6 for receiving the electrical cable 24, in an embodiment for receiving an end section 30 of the electrical cable 24. Further, the receptacle 28 may also be configured for receiving the core assembly 10. In particular, the receptacle 28 may be formed by a lead-through opening 32 extending through the connector housing 26. Thereby, the core assembly 10 is accessible to the mating connector 4 on one end 34 of the lead-through opening 32 and to the electrical cable 24 on the other end 36 of the lead-through opening 32. The electrical cable 24 can be installed in the receptacle 28 of the connector housing 26 by attachment of the cable retention assembly 22, wherein said attachment may take place prior to reception of the core assembly 10 within the receptacle 28 or thereafter.

In an embodiment, the receptacle 28 has a rotationally symmetric inner surface with respect to the mating direction 6. Accordingly, the core assembly 10 may be rotationally symmetric with respect to the mating direction 6. In particular, the contact 18, the outer protection element 48, the inner protection element 64, the front protection element 50, the cable fixation sleeve 98, the shield support sleeve 108 and/or the sealing device 125 may be rotationally symmetric with respect to the mating direction 6.

The above-mentioned locking element 74 of the housing assembly 8 may be formed within the connector housing 26 adjacent to the receptacle 28. In particular, one of the circumferential groove 76 and circumferential bead 104 may be formed on an internal surface of the connector housing 26.

For reduced manufacturing costs, the connector housing 26 may be a single, injection-molded, component. Alternatively, the connector housing 26 may comprise at least two housing halves, each housing half comprising a recess, which forms the receptacle 28 together with the recesses of the remaining housing halves. The housing halves may be attached to each other perpendicularly to the mating direction 6. The housing halves may in particular be connected to each other by latching, clipping, gluing, welding and/or screws.

The contact 18 may be a turned, forged, cast or drawn contact element 38 made of copper or other electrically conductive material. Alternatively, the contact 18 may be a stamped and bent part. Further, the contact 18 may have a sleeve-shaped section 40 configured for electrical termination of the electrical cable 24, as shown in FIG. 3. For example, the sleeve-shaped section 40 may be crimped onto an end section 42 of a conductor 44 of the electrical cable 24 (see FIG. 6). Alternatively, the sleeve-shaped section 40 may be soldered, welded or otherwise bonded to the end section 42 of the conductor 44.

Figure 3:
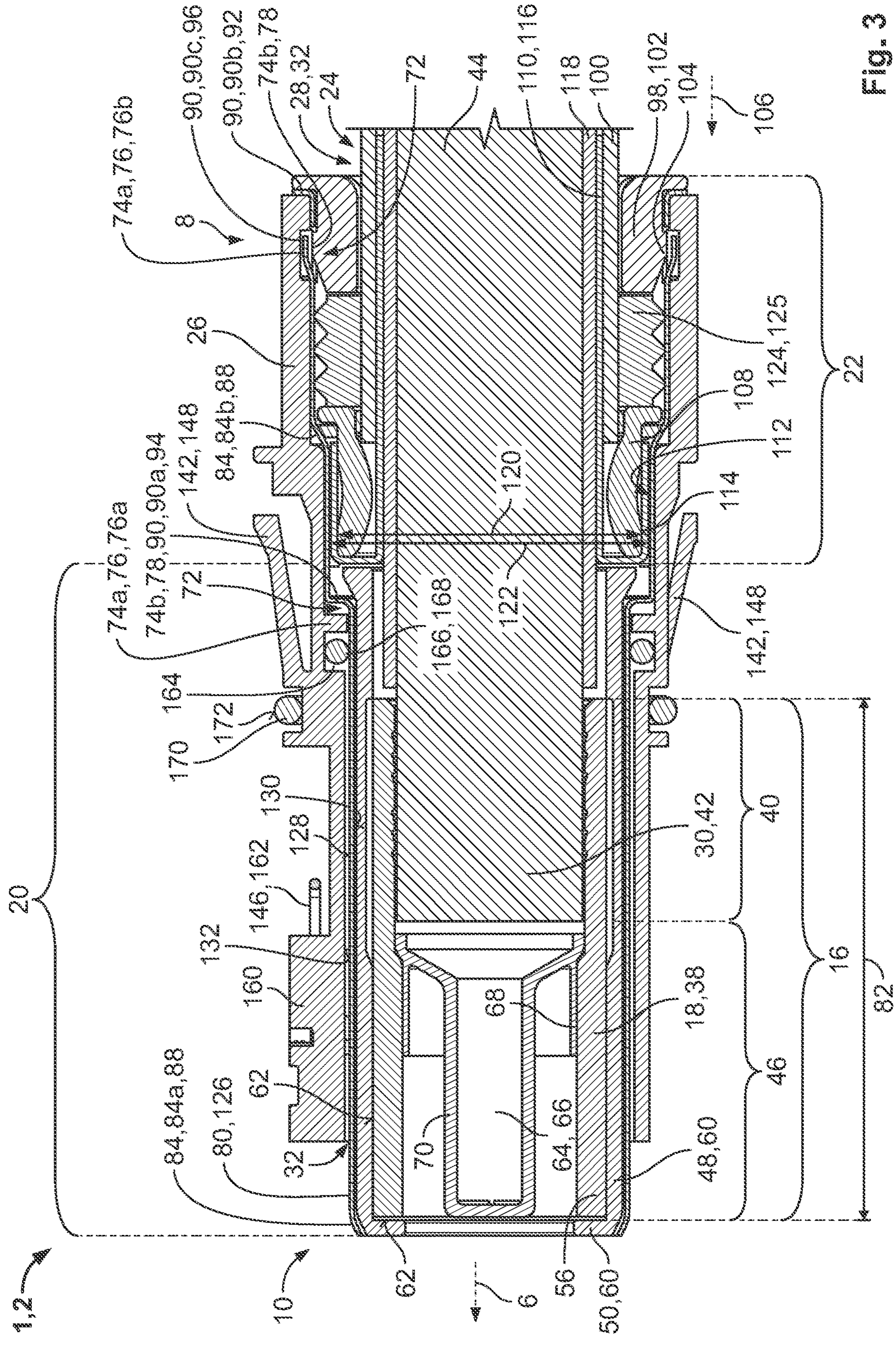
FIG. 3 is a sectional side view of the electrical connector of FIG. 1.

In the shown exemplary embodiment of FIG. 3, the contact 18 has a socket-shaped section 46 configured to receive and electrically contact a pin-shaped section of the mating contact. The socket-shaped section 46 is positioned opposite to the sleeve-shaped section 40 with respect to the mating direction 6.

Figure 5:
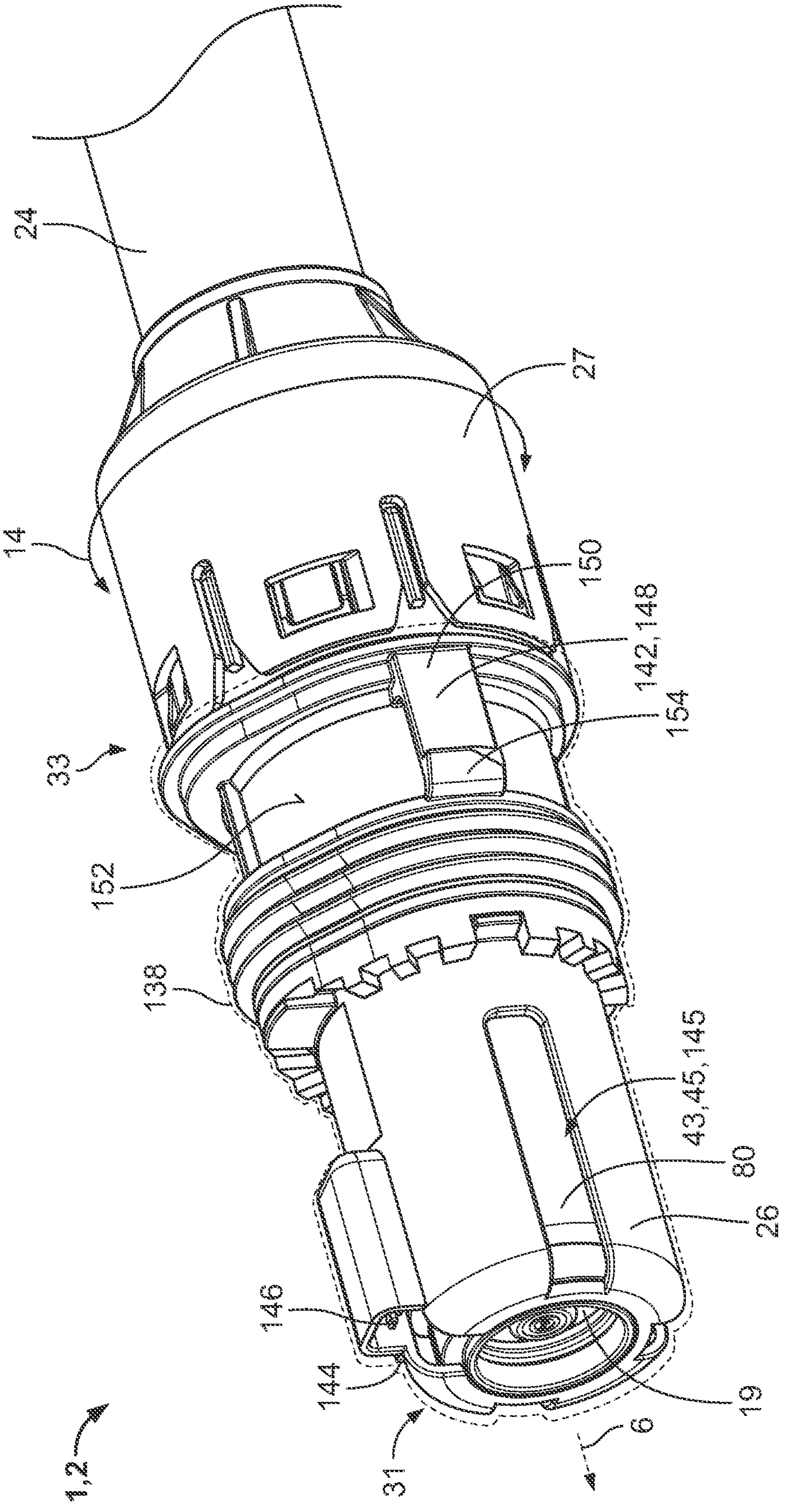
FIG. 5 is a perspective view of an electrical connector according to another embodiment.
Figure 6:
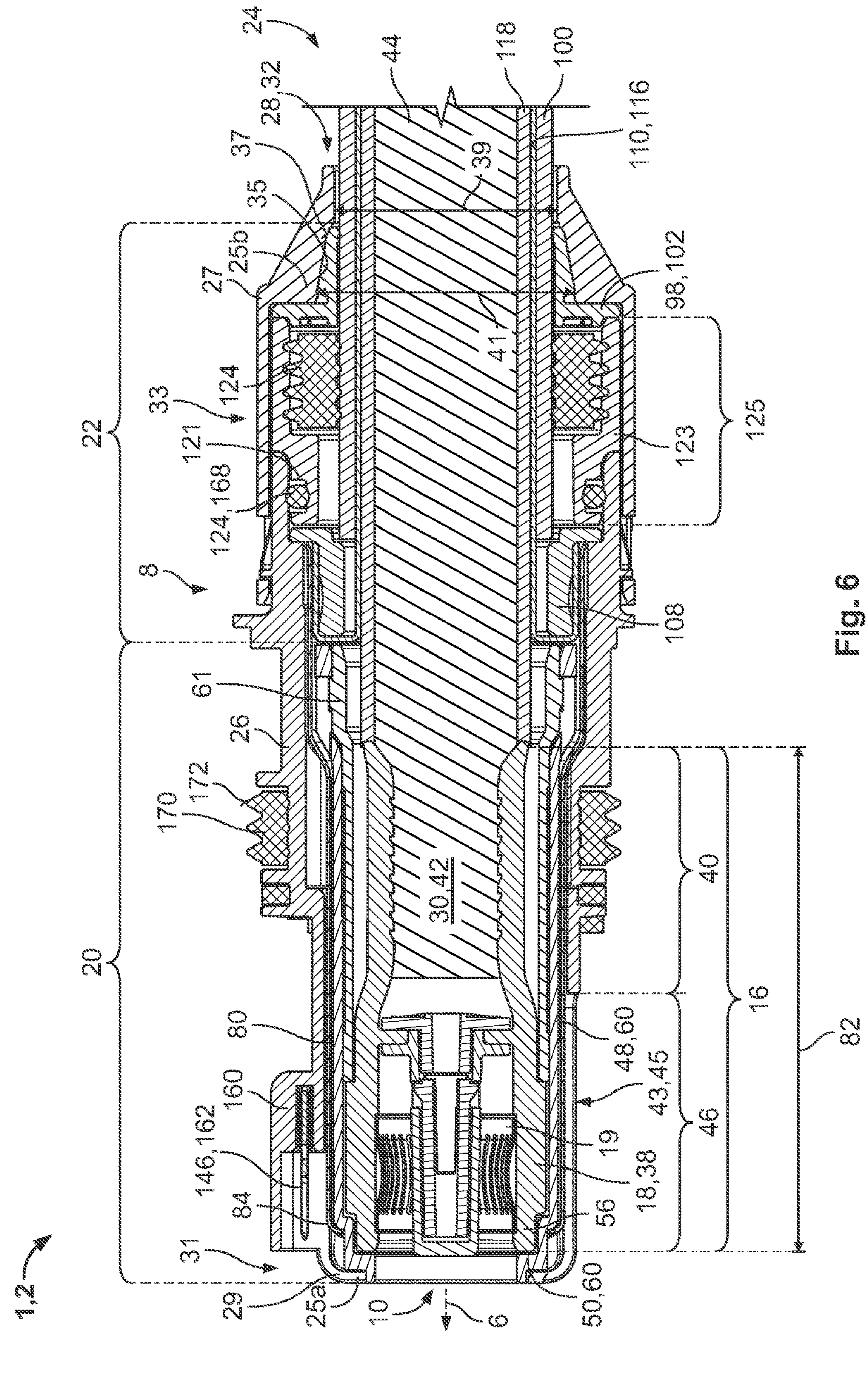
FIG. 6 is a sectional side view of the electrical connector of FIG. 5.

In the exemplary embodiment shown in FIGS. 5 and 6, the contact assembly 16 further comprises a flexible, electrically conductive contact spring 19, which is arranged within the socket-shaped section 46 of the contact 18 in order to increase contact forces and/or decrease mating forces. In another embodiment, the contact 18 may have a pin-shaped section configured to be inserted into a socket-shaped section of the mating contact, in order to establish electrical contacting therewith. The contact spring may optionally be arranged on the pin-shaped section of the contact. It is to be understood that the term "electrically conductive" refers to a property of the contact spring having an electrical conductivity comparable to the contact 18 and higher than the finger protection assembly 20.

The finger protection assembly 20 may comprise an outer protection element 48 and a front protection element 50, shown in FIG. 3, which protect the contact 18 against unwanted touch by human fingers or other components besides the mating contact. The outer protection element 48 may surround the contact 18, in order to cover it in a radial direction 52 with respect to the mating direction 6, while the front protection element 50 may cover a front part 56 of the contact 18 in an axial direction 54, with respect to the mating direction. In particular, the front protection element 50 may cover a front end 58 of the contact 18 which extends towards the outside of the housing assembly 8. The front end 58 of the contact 18 may, in particular, be a free end of the contact 18.

In the shown exemplary embodiment of FIG. 3, the outer protection element 48 and the front protection element 50 are monolithically connected to each other and form a protective collar 60 around the entire external surface 62 of the socket-shaped section 46 of the contact 18. Consequently, the front part 56 of the contact 18 may extend outwards of the housing assembly 8 and be covered by the protective collar 60.

As can be seen in the sectional views of FIGS. 3 and 6, the protective collar 60 is also formed around the external surface of the sleeve-shaped section 40 of the contact 18. Accordingly, the socket-shaped section 46 and the sleeve-shaped section 40 of the contact 18 may be insertable into the protective collar 60. In the embodiment of FIG. 3, the protective collar 60 is press-fitted on the sleeve-shaped section 40 of the contact 18. In the embodiment of FIG. 6, the finger protection assembly 20 further comprises a spacer sleeve 61, which is insertable into the protective collar 60 after insertion of the contact 18. The spacer sleeve 61 is attached to the protective collar 60 by latching. Thus, the contact 18 is axially supported by the protective collar 60 and the spacer sleeve 61 from two opposing directions, thus preventing removal of the contact 18 from the protective collar 60.

In an embodiment, the finger protection assembly 20 may further comprise an inner protection element 64 surrounded by the socket-shaped section 46 of the contact 18, as shown in FIG. 3. In particular, the inner protection element 64 may be a cup-shaped or pillar-shaped body 66 inserted into the socket-shaped section 46 of the contact 18. In the shown embodiment, the body 66 exhibits a cup-shaped segment 68 and a pillar-shaped segment 70. Alternatively, in an embodiment comprising the contact having a pin-shaped section, the front protection element 50 may be a protective cap attached to a tip of the pin-shaped section.

The outer protection element 48, front protection element 50, and inner protection element 64 may each be made of an electrically insulating material, having an electrical conductivity lower than the contact 18.

As can be seen in the sectional view of FIG. 3, the electrical connector 1 may comprise a locking structure 72 which is configured to lock the core assembly 10 to the housing assembly 8, thereby blocking a translational relative movement between the core assembly 10 and the housing assembly 8. By the locking structure 72, the core assembly 10 may be held captive to the housing assembly 8. Thus, a loss of the core assembly 10 or the housing assembly 8 is prevented, while maintaining the relative rotatability between the core assembly 10 and the housing assembly 8.

The locking structure 72 may comprise at least one pair of locking elements 74*a*, 74*b* that are in engagement with one another. One of the locking elements 74*a* may be, in an embodiment continuous, a circumferential groove 76. The other one of the locking elements **74*b* may be at least one form-fit element 78, extending into the corresponding circumferential groove 76. The at least one form-fit element 78 may be formed on one of the housing assembly 8 and the core assembly 10. Accordingly, the corresponding circumferential groove 76 may be formed on the respective other one of the housing assembly 8 and core assembly 10**.

As will be described in further detail below, each circumferential groove 76 in the shown exemplary embodiment of FIG. 3 is formed on the housing assembly 8, while each form-fit element 58 is formed on the core assembly 10. In particular, the locking structure 72 comprises two pairs of locking elements **74*a*, 74*b* that are respectively in engagement with one another. Accordingly, two circumferential grooves 76*a*, 76*b* are formed on the housing assembly 8. More specifically, in an embodiment, two circumferential grooves 76*a*, 76*b* are formed within the connector housing 26 adjacent to the receptacle 28**.

Optionally, the locking element 72 of the core assembly 10 may be located on the cable retention assembly 22. Thereby, the cable retention assembly 22 can additionally fulfil the function of rotatably attaching the housing assembly 8 to the electrical cable 24.

The core assembly 10 may further comprise a shield sleeve 80, in which the contact assembly 16 is at least partially received. In the shown embodiment of FIG. 3, the contact assembly 16 is entirely received in the shield sleeve 80. Further, in the embodiment of FIG. 3, the finger protection assembly 20 and the cable retention assembly 22 are also entirely received in the shield sleeve 80. In the shown embodiment of FIG. 6, the cable retention assembly 22 is only partially received, while the contact assembly 16 and the finger protection assembly 20 are entirely received in the shield sleeve 80. In particular, the shield sleeve 80 may radially surround the contact 18 along the entire length 82 of the contact 18. Further, the shield sleeve 80 may be continuously spaced apart and insulated from the contact 18 by the outer protection element 48 of the finger protection assembly 20.

In an embodiment, the shield sleeve 80 is electrically conductive and thus may especially serve as a protection against electromagnetic interference caused by or affecting the contact 18. In particular, the shield sleeve 80 may radially surround the contact 18 along the entire length of the contact 18. Further, the shield sleeve 80 may be continuously spaced apart and insulated from the contact 18 by the outer protection element 48 of the finger protection assembly 20. It is to be understood that the term "electrically conductive" refers to a property of the shield sleeve 80 having an electrical conductivity comparable to the contact 18 and higher than the finger protection assembly 20.

The shield sleeve 80 may comprise at least one radially inwardly protruding section 84 engaging with one of the finger protection assembly 20 and the cable retention assembly 22. In an embodiment, the shield sleeve 80 comprises at least one radially inwardly protruding section 84 for each of the finger protection assembly 20 and the cable retention assembly 22 engaging with the finger protection assembly 20 and the cable retention assembly 22, respectively. Through said engagement, the shield sleeve 80 may hold together the contact assembly 16, the finger protection assembly 20, and the cable retention assembly 22 as one unit, thereby maintaining the integrity of the core assembly 10.

The at least one radially inwardly protruding section 84 may extend continuously or discontinuously around the shield sleeve 80 along a circumferential direction 86, with respect to the mating direction 6. In particular, the at least one radially inwardly protruding section 84 may be formed by a step, a flange, a shoulder or a taper 88 extending inwards of the shield sleeve 80. Alternatively or additionally, the at least one radially inwardly protruding section 84 may be formed by multiple latching tabs circumferentially distributed around the shield sleeve 80 and extending obliquely inwards of the shield sleeve 80.

The shield sleeve 80 may further comprise at least one radially outwardly protruding section 90, engaging with the housing assembly 8. Analogously, the at least one radially outwardly protruding section 90 may extend along the circumferential direction 86 around the shield sleeve 80 in a continuous or discontinuous manner. In particular, the at least one radially outwardly protruding section 90 may be formed by a step, a flange 92, a shoulder 94 or a taper extending outwards of the shield sleeve 80. Alternatively or additionally, the at least one radially outwardly protruding section 90 may be formed by multiple latching tabs 96, circumferentially distributed around the shield sleeve 80 and extending obliquely outwards of the shield sleeve 80.

In the shown exemplary embodiment of FIG. 3, the shield sleeve 80 comprises one radially inwardly protruding section **84*a* in the form of the taper 88, for engaging with the finger protection assembly 20 and one radially inwardly protruding section 84*b* in the form of the taper 88, for engaging with the cable retention assembly 22. Further, the shield sleeve 80 shown in FIG. 3 comprises one radially outwardly protruding section 90*a* in the form of the shoulder 94, one radially outwardly protruding section 90*b* in the form of the flange 92 and one radially outwardly protruding section 90*c* in the form of the multiple latching tabs 96. The flange 92 and the tabs 96 respectively engage with the housing assembly 8** in two mutually opposite directions.

The shoulder 94 embodies the above-described form-fit element 78 and thus represents one of the locking elements **74*b* of the locking structure 72. In particular, the shoulder 94 extends into the circumferential groove 76*a* of the connector housing 26 as can be seen in FIG. 3**.

The above-described locking element 72 of the core assembly 10 may be located on the shield sleeve 80. In particular, the locking element 72 of the core assembly 10 may be embodied by one of the at least one radially outwardly protruding section 90 and radially inwardly protruding section 84. In other words, the at least one radially outwardly protruding section 90 may provide the form-fit element 78. Alternatively, the at least one radially inwardly protruding section 84 may provide the circumferential groove 76.

The cable retention assembly 22 may comprise a cable fixation sleeve 98 configured to radially abut against a cable insulation 100 of the electrical cable 24. In particular, the cable fixation sleeve 98 may be sleeved over the end section 42 of the conductor 44, which is surrounded by the cable insulation 100, as shown in FIG. 3. The cable fixation sleeve 98 can thus fulfil the function of securing the electrical cable 24 at least in the radial direction 52. Optionally, the cable fixation sleeve 98 may press radially against the cable insulation 100 and thus secure the electrical cable 24 in the axial direction 54, thereby serving as a strain relief for the electrical cable 24. In particular, the cable fixation sleeve 98 may be pressed by the housing assembly 8 radially against the cable insulation 100, as will be described in further detail below. The locking element 74 of the core assembly 10 may be located on the cable fixation sleeve 98.

In an embodiment, the cable fixation sleeve 98 may have a ring-shaped body 102 with a chamfered, barb-like circumferential bead 104. The circumferential bead 104 may be one of continuous and discontinuous and may extend into the circumferential groove 76*b* of the connector housing 26 as the at least one form-fit element 78. The chamfered property of the circumferential bead 104 facilitates the introduction into the corresponding circumferential groove 76*b* in an assembly direction 106. The barb-like property of the circumferential bead 104 prevents removal from the circumferential groove 76*b* in a direction opposite to the assembly direction 106. In another embodiment, the cable fixation sleeve 98 may comprise the circumferential groove 76*b* as the locking element and the connector housing 26 may comprise the circumferential bead 104 as the other locking element, respectively.

Optionally, the cable fixation sleeve 98 may comprise inwardly facing teeth, which grab into the cable insulation 100 of the electrical cable 24 and additionally secure the electrical cable 24 in the axial direction 54. In an embodiment, the teeth are hook-shaped and sloped in the mating direction 6. Thereby, the cable fixation sleeve 98 can be easily sleeved over the cable insulation 100 of the electrical cable 24 against the mating direction 6, while removal of the cable fixation sleeve 98 is impeded. In an alternative embodiment, the cable fixation sleeve 98 may comprise the circumferential groove 76 as the locking element 74 and the housing assembly 8 may comprise the circumferential bead 104 as the other locking element 74, respectively.

The cable retention assembly 22 may further comprise a shield support sleeve 108 configured to support a shield 110 of the electrical cable 24. In particular, the shield support sleeve 108 may radially support a contacting area 112 between the shield sleeve 80 and the shield 110 of the electrical cable 24. As can be seen in the sectional view of FIG. 3, the shield support sleeve 108 provides a circumferential seating surface 114, on which the shield sleeve 80 and the shield 110 of the electrical cable 24 rest on top of each other. For this, the shield support sleeve 108 is sleeved over the end section 30 of the electrical cable 24 and positioned under at least a layer of the shield 110 of the electrical cable 24. Particularly, the shield 110 of the electrical cable 24 may be locally exposed, flared and rolled back over the shield support sleeve 108. Alternatively, the exposed shield 110 of the electrical cable 24 may be rolled back and over the shield support sleeve 108.

The shield 110 of the electrical cable 24 may for example comprise a braid shield 110 and/or a foil shield, which is surrounded by the cable insulation 100. The shield 110 itself surrounds the conductor 44 of the electrical cable 24 and is spaced apart from the conductor 44 by an insulation layer 118 of the electrical cable 24. In this context, the prepositions "under" and "below" are each to be understood as referring to a radial position located between the shield 110 and the insulation layer 118. Further, the term "exposed" refers to a state where a part of the cable insulation 100 is removed, such that the shield 110 of the electrical cable lies bare.

As is apparent from FIG. 3, a difference between the outer diameter 120 of the shield support sleeve 108 and the inner diameter 122 of the shield sleeve 80, in an embodiment, allows the shield 110 of the electrical cable 24 to be sandwiched therebetween. In another embodiment, the shield 110 is press-fit between the shield sleeve 80 and the shield support sleeve 108. As an alternative to the press-fit, the shield sleeve 80 may also be crimped onto the shield support sleeve 108. Thereby, the above-mentioned contacting area 112 between the shield sleeve 80 and the shield 110 of the electrical cable 24 can be sufficiently distanced from the contact 18 as well as from the outside of the electrical connector 1.

The shield support sleeve 108 may be arranged, in the axial direction 54 in an embodiment, between the cable fixation sleeve 98 and the finger protection assembly 20. In particular, the cable fixation sleeve 98, the shield support sleeve 108 and the finger protection assembly 20 may be coaxially aligned along the mating direction 6, as shown in FIG. 3.

The outer protection element 48 and/or the spacer sleeve 61 of the finger protection assembly 20 may abut axially against the shield 110 of the electrical cable 24, folded over the shield support sleeve 108. Further, the outer protection element 48 of the finger protection assembly 20 may be axially supported by the shield sleeve 80 and the cable retention assembly 22 from two opposing directions. Alternatively, the outer protection element 48 of the finger protection assembly 20 may be axially supported by the housing assembly 8 and the cable retention assembly 22 from two opposing directions. For this, the housing assembly 8 may comprise an inward protrusion 29, as will be described further below. Thereby, the relative position of the outer protection element 48 can be maintained within the electrical connector 1.

Further, the cable retention assembly 22 may comprise a sealing device 125 arranged between the cable fixation sleeve 98 and the shield support sleeve 108. In the shown embodiment of FIG. 3, the sealing device 125 comprises at least one sealing element 124, having an annular shape in an embodiment, arranged between the cable fixation sleeve 98 and the shield support sleeve 108. The at least one sealing element 124 may radially abut against the shield sleeve 80 and the cable insulation 100, thus preventing moisture and/or dirt from passing through a gap between the shield sleeve 80 and the electrical cable 24. Alternatively, the at least one sealing element 124 may directly abut against the housing assembly 8, instead of the shield sleeve 80, thereby preventing moisture and/or dirt from passing through a gap between the housing assembly 8 and the electrical cable 24. Advantageously, the direct abutment of the at least one sealing element 124 against the housing assembly 8 can create a certain frictional resistance, which hinders the housing assembly 8 from loosely rotating around the electrical cable 24, while not completely suppressing the rotatability.

In the shown embodiment of FIG. 6, the sealing device 125 comprises two sealing elements 124 and a seal support sleeve 123 with a higher rigidity than the two sealing elements 124. The seal support sleeve 123 may primarily be utilized to prevent an axial deformation of the core assembly 10, e.g. due to compression of the at least two sealing elements 124. The seal support sleeve 123 is positioned between the cable fixation sleeve 98 and the shield support sleeve 108 to axially abut against the cable fixation sleeve 98 and the shield support sleeve 108, respectively. The two sealing elements 124 are arranged between the abutment area of the seal support sleeve 123 with the cable fixation sleeve 98 and the abutment area of the seal support sleeve 123 with the shield support sleeve 108.

Due to its higher rigidity, the seal support sleeve 123 creates a mechanical reinforcement structure for the at least two sealing elements 124, e.g. when the cable 24 is pulled in the axial direction 54. The prevention of axial deformation is especially important in embodiments of the electrical connector 1 having a contact spring, which requires an exact positioning of the contact spring with respect to the mating connector 4.

As can further be seen from FIG. 6, the two sealing elements 124 are arranged on opposite surfaces of the seal support sleeve 123. In particular, one of the two sealing elements 124 radially abuts against the seal support sleeve 123 and the housing assembly 8, while being positioned on an outer circumferential surface of the seal support sleeve 123 in a circumferential seal reception notch 121 formed on the outer circumferential surface of the seal support sleeve 123. The other one of the two sealing elements 124 is positioned on an inner circumferential surface of the seal support sleeve 123, while radially abutting against the seal support sleeve 123 and the cable insulation 100.

The seal support sleeve 123 may also be utilized for prepositioning the at least two sealing elements 124 and other components of the core assembly 10, such as the shield support sleeve 123, when assembling the electrical connector 1 on the electrical cable 24. Further, the at least two sealing elements 124 may be mutually offset along the mating direction 6 in order to save space in the radial direction 52.

In another embodiment, the cable fixation sleeve 98 and the shield support sleeve 108 may be monolithically connected with the seal support sleeve 123 of the sealing device 125 to form a single, sleeve-shaped component.

The outer protection element 48 of the finger protection assembly 20 may be axially supported by the shield sleeve 80 and the cable retention assembly 22 from two opposing directions. This can be seen in the sectional view of FIG. 3, where the outer protection element 48 abuts axially against the taper 88 of the shield sleeve 80, while also axially abutting against the shield 110 of the electrical cable 24 folded over the shield support sleeve 108 of the cable retention assembly 22.

Alternatively, the outer protection element 48 of the finger protection assembly 20 may be axially supported by the housing assembly 8 and the cable retention assembly 22 from two opposing directions, as shown in the embodiment of FIG. 6. For this, the housing assembly 8, in particular the connector housing 26, comprises an inward protrusion 29 forming a circumferential internal shoulder 25*a* at a front section 31 of the connector housing 26, the front section 31 of the connector housing 26 being situated adjacent to the front part 56 of the contact 18. In the shown embodiment of FIG. 6, the outer protection element 48 and the spacer sleeve 61 both abut axially against the shield 110 of the electrical cable 24 folded over the shield support sleeve 108 of the cable retention assembly 22.

As shown in the embodiment of FIGS. 5 and 6, the housing assembly 8 may comprise a housing lid 27 in addition to the connector housing 26. The housing lid 27 may be a substantially hollow cylindrical structure sleeved over the electrical cable 24. Further, the housing lid 27 may at least partly encompass a rear section 33 of the connector housing 26, the rear section 33 of the connector housing 26 being situated opposite of the front section 31 of the connector housing 26 with respect to the mating direction 6. The housing lid 27 may be attached to the connector housing 26 along the mating direction 6 after insertion of the core assembly 10 into the receptacle 28 of the connector housing 26. In particular, the housing lid 27 may be connected to the connector housing 26 by a force-transmitting connection capable of transmitting forces along the assembly direction 106. In the shown embodiment of FIGS. 5 and 6, the housing lid 27 is connected to the connector housing 26 by latching. Alternatively, clipping, gluing, welding and/or screws may be utilized.

The sectional view of FIG. 6 clearly shows how the connector housing 26 and housing lid 27 cooperate to hold captive the core assembly 10. In particular, the core assembly 10 is locked to the housing assembly 8 by the circumferential internal shoulder 25*a* of the connector housing 26 and another circumferential internal shoulder 25*b* formed on the housing lid 27 distal from the circumferential internal shoulder 25*a* of the connector housing 26. In other words, the circumferential shoulders 25*a*, 25*b* axially support the core assembly 10 from two opposing directions.

Optionally, the housing lid 27 may comprise a conical inner surface 35 having a smallest diameter 39 and widening in the mating direction 6, as shown in FIG. 6. At a position overlapping with the conical inner surface 35, the cable fixation sleeve 98 may comprise a conical outer surfaces 37 having a biggest diameter 41 and widening in the mating direction 6. The smallest diameter 39 of the conical inner surface 35 is smaller than the biggest diameter 41 of the conical outer surface 37 such that these conical surfaces 35, 37 slide along each other, when attaching the housing lid 27 to the connector housing 26. Thereby, the radial pressure of the cable fixation sleeve 98 exerted onto the cable insulation 100 is gradually increased. In an assembled state of the electrical connector 1, the cable fixation sleeve 98 may thus serve as the strain relief for the electrical cable 24.

The conical outer surface 37 of the cable fixation sleeve 98 may comprise a normal vector containing a component pointing against the assembly direction 106, while the conical inner surface 35 of the housing lid 27 may comprise a normal vector containing a component pointing in the assembly direction 106. Thus, in case the electrical cable 24 is pulled against the assembly direction 106, for example in a mated state of the electrical connector 1 and the mating connector 4, the radial pressure exerted onto the cable insulation 100 by the cable fixation sleeve 98 is further increased due to the abutment of the conical outer surface 37 of the cable fixation sleeve 98 with the conical inner surface 35 of the housing lid 27. This causes the inwardly facing teeth of the cable fixation sleeve 98 to grab into the cable insulation 100 even stronger.

Further, the abutment of these conical surfaces 35, 37 in combination with the force-transmitting connection between the housing lid 27 and the connector housing 26 establishes a closed flux of force between the rear section 33 and the front section 31, which prevents disintegration of the core assembly 10, in case the electrical cable 24 is pulled against the assembly direction 106.

The above-mentioned frictional resistance may advantageously also occur between the conical inner surface 35 of the housing lid 27 and the conical outer surface 37 of the cable fixation sleeve 98, thereby hindering the housing assembly 8 from loosely rotating around the electrical cable 24, while not completely suppressing the rotatability.

The shield sleeve 80 may form an outer hull 126 of the core assembly 10, as shown in FIGS. 1-3. In an embodiment, the shield sleeve 80 may provide an external bearing surface 128 for relative rotational movement between the core assembly 10 and the housing assembly 8. Additionally or alternatively, the shield sleeve 80 may provide an internal bearing surface 130 for relative rotational movement between the shield sleeve 80 and the contact assembly 16, the finger protection assembly 20 as well as the cable retention assembly 22. In an embodiment, the internal and/or external bearing surfaces 128, 130 are rotationally symmetric with respect to the rotational axis 12, respectively. Accordingly, the receptacle may have an inner surface 132, which is rotationally symmetric with respect to the rotational axis 12. Also accordingly, the contact 18, the outer protection element 48, the inner protection element 64, the front protection element 50, the cable fixation sleeve 98, the shield support sleeve 108 and/or the at least one sealing element 124 may be rotationally symmetric with respect to the rotational axis 12. The shield sleeve 80 may serve as a slide sleeve and/or slide bushing.

As can be seen in FIG. 1, a front section of the shield sleeve 80 may stick out of the housing assembly 8 and be configured for contacting a grounding contact of the mating connector 4. In the embodiment shown in FIG. 5, at least one access slit 43, and in an embodiment multiple access slits 43 are provided on the housing assembly 8 to allow the grounding contact access to the shield sleeve 80. This will be described in further detail below.

Figure 4:
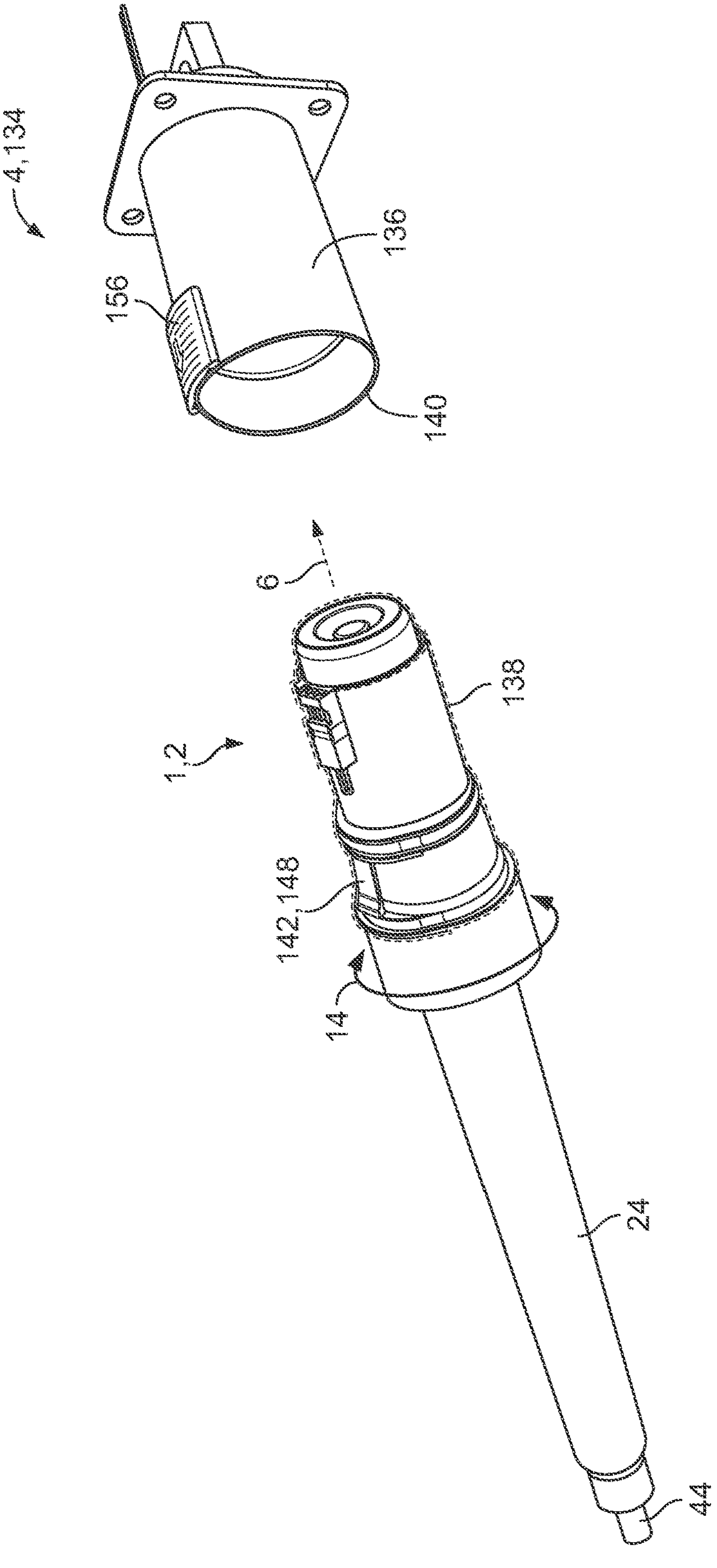
FIG. 4 is a perspective view of the electrical connector of FIG. 1 and a mating connector.

In the perspective view of FIG. 4, the electrical connector 1 is shown together with an exemplary embodiment of the mating connector 4 in a ready-to-mate position. The mating connector 4 is shown as a socket 134 with a female connector face 136 configured to at least partially receive the electrical connector 1 along the mating direction 6. Within the female connector face 136, the mating contact is arranged and accessible to the contact 18 of the electrical connector 1 upon mating.

As can be seen in FIG. 4, the connector housing 26 of the electrical connector 1 has an outer contour 138 which is rotationally asymmetric, with respect to the rotational axis 12. Advantageously, this asymmetric outer contour 138 does not impose a restriction during handling of the electrical connector 1 as the connector housing 26 can be freely oriented, with respect to the core assembly 10 and the electrical cable 24. Especially, the routing of the electrical cable 24 has no influence on the resulting angular orientation of the connector housing 26, since the housing assembly 8 in general and the connector housing 26 in particular is rotatable, with respect to the electrical cable 24. Therefore, limitations in the design of the connector housing 26 are alleviated, for the outer contour 138 of the connector housing 26 can be designed without necessarily fulfilling symmetry conditions, yet also without creating the drawbacks of an asymmetrically designed connector housing 26 which is not rotatable with respect to the electrical cable 24.

The female connector face 136 of the mating connector 4 has an inner contour 140 which is complementary to the outer contour 138. Thus, a certain relative angular orientation between the connector housing 26 and the female connector face 136 is required for mating the electrical connector 1 with the mating connector 4. Due to the above-described rotatability of the housing assembly 8 in general and the connector housing 26 in particular, the connector housing 26 can be oriented in the correct angular orientation with respect to the mating connector 4, without having to twist or otherwise rotate the electrical cable 24.

The rotationally asymmetric outer contour 138 of the connector housing 26 may derive from at least one of a rotationally asymmetric locking feature 142, a rotationally asymmetric coding feature 144 and a rotationally asymmetric in the arranged circuitry element 146. In the shown exemplary embodiment of FIG. 1, the connector housing 26 comprises one of each of these features 142, 144, 146. Accordingly, the mating connector comprises complementarily features for interaction with the features 142, 144, 146.

The locking feature 142 may be a mechanical structure, such as a cantilever tab 148, for securing the connector housing 26 to the mating connector 4. In particular, the cantilever tab 148 may have a supported end 150 connected to the external surface 152 of the connector housing 26 and a free end 154 which extends obliquely away from the external surface 152, while pointing in or against the mating direction 6. The free end 154 may be configured to axially abut against an inner edge formed within the female connector face 136 of the mating connector 4. The mating connector 4 may comprise an unlocking slider 156, for pushing the free end 154 out of abutment with the inner edge and thereby releasing the connector housing 26 from the mating connector 4.

The coding feature 144 may be a mechanical structure, such as an axial fin 158, defining a certain relative angular orientation between the connector housing 26 and the mating connector 4, which is required for mating. In particular, the axial fin 158 may extend along the external surface 152 of the connector housing 26 in the mating direction 6. A slot shaped complementarily to the axial fin 158 may be formed within the female connector face 136 of the mating connector 4 and configured to receive the axial fin 158. In applications, which involve multiple matching pairs of electrical connectors 1 and mating connectors 4, the coding feature 144 may also be utilized to prevent a mix-up of connectors by only allowing mating of the matching pairs according to a key-lock principle.

The circuitry element 146 may be integrated in a circuitry container 160 formed on the external surface 152 of the connector housing 26, as shown in FIG. 1. The mating connector 4 may comprise an open circuitry of a monitoring circuit 162, wherein the circuitry element 146 may be a part of the monitoring circuit 162 which is configured for closing said open circuitry upon mating. The monitoring circuit 162 may, in particular, be a high-voltage interlock circuit for detecting a mated state as well as an unmated state of the electrical connector 1 and mating connector 4.

Additionally or alternatively, the rotationally asymmetric outer contour 138 of the connector housing 26 may also derive from at least one rotationally asymmetric grounding feature 145. The grounding feature 145 may be the above-introduced at least one access slit 43. In the shown embodiment of FIG. 5, multiple such access slits 43 are formed by substantially rectangular, lateral slots 45 in the connector housing 26 extending along the mating direction 6 at overlapping positions with the shield sleeve 80. Through these access slits 43, the grounding contact of the mating connector 4 can pass and reach the shield sleeve 80 for grounding purposes.

Optionally, the connector housing 26 may comprise a combination of multiple such locking features 142, coding features 144, grounding features 145 and/or circuitry elements 146.

Further sealing elements may be provided in and on the electrical connector 1. For example, one of the radially outwardly protruding section 90 and radially inwardly protruding section 84 of the shield sleeve 80 may provide a seat 164 for receiving a first additional sealing element 166 in the form of a seal ring 168. A second additional sealing element 170 may be provided on the external surface 152 of the connector housing 26. The second additional sealing element 170 may comprise an external sealing surface 172 which is configured to seal a gap between the connector housing 26 and the female connector face 136 of the mating connector. The external sealing surface 172 may extend outwards of the circuitry element 146, with respect to the receptacle 28. This is best shown in FIG. 2, where for each point on the outer surface of the circuitry element 146 a point on the external sealing surface 172 exist, which has a greater distance from the receptacle 28.

The connector 1 of the present invention is easier to handle and less easily damaged. The core assembly 10 includes all necessary components required for establishing an electrical connection between the mating connector 4 and the electrical cable 24, while being rotationally decoupled from the housing assembly 8. Especially a transmission of circumferential forces between the housing assembly 8 and the cable retention assembly 22, being part of the core assembly 10, is limited. Thereby, only a minimum of torsional load is transferrable from the housing assembly 8 to the electrical cable 24, when the cable retention assembly 22 is attached to the electrical cable 24. This eases handling of the electrical connector 1, due to an increase of movement flexibility, and also reduces the risk of damage to the electrical connector 1. The term “circumferential forces” is to be understood as referring to forces which act in a circumferential direction with respect to the relative rotatability between the core assembly 10 and the housing assembly 8.

Angular relative movement between the core assembly 10 and the housing assembly 8 is unlimited, further decreasing the risk of torsional load transfer between the electrical connector 1 and the corresponding attached electrical cable 24.

The electrical connector 1 in general and the connector housing 26 in particular can be provided with the above-introduced auxiliary features (i.e. locking features, coding features, circuitry elements) for interaction with complementary features of the mating connector 4, without resulting in a limitation to the required angular orientation between the mating connector 4 and the electrical cable 24 during mating. This is particularly advantageous in applications with comparably thick and stiff electrical cables, which inherently resist twisting. The required angular orientation for mating is only limited due to the complementary features of the mating connector 4, having to match the auxiliary features. As the auxiliary features are provided on the connector housing 26, which is decoupled from the electrical cable 24, the electrical cable 24 itself does not have to be twisted in order to orientate the connector housing 26, with respect to the mating connector 4. This facilitates the handling of the electrical connector 1 and electrical cable 24.

What is claimed is:

1. An electrical connector configured to be mated to a mating connector, comprising:

a housing assembly; and a core assembly held rotatably within the housing assembly, the core assembly including a contact assembly having a contact configured to electrically contact a mating contact of the mating connector, a finger protection assembly configured to at least partially cover the contact assembly, and a cable retention assembly configured to be attached onto an electrical cable.

2. The electrical connector of claim 1, wherein the finger protection assembly has an outer protection element surrounding the contact and a front protection element covering a front part of the contact.

3. The electrical connector of claim 1, further comprising a locking structure locking the core assembly to the housing assembly.

4. The electrical connector of claim 3, wherein the locking structure blocks a translational relative movement between the core assembly and the housing assembly.

5. The electrical connector of claim 4, wherein the locking structure has a pair of locking elements engaging one another, one of the locking elements is a circumferential groove and the other one of the locking elements is a form-fit element extending into the circumferential groove.

6. The electrical connector of claim 5, wherein the form-fit element is formed on one of the housing assembly and the core assembly and the circumferential groove is formed on the other of the housing assembly and the core assembly.

7. The electrical connector of claim 6, wherein the locking element of the core assembly is located on the cable retention assembly.

8. The electrical connector of claim 1, wherein the core assembly has a shield sleeve in which the contact assembly, the finger protection assembly, and the cable retention assembly are at least partially received.

9. The electrical connector of claim 8, wherein the shield sleeve has a radially inwardly protruding section engaging with one of the finger protection assembly and the cable retention assembly.

10. The electrical connector of claim 8, wherein the shield sleeve has a radially outwardly protruding section engaging with the housing assembly.

11. The electrical connector of claim 8, wherein the shield sleeve forms an outer hull of the core assembly.

12. The electrical connector of claim 1, wherein the cable retention assembly has a cable fixation sleeve configured to radially abut against a cable insulation of the electrical cable.

13. The electrical connector of claim 12, wherein the cable retention assembly has a shield support sleeve configured to support a shield of the electrical cable.

14. The electrical connector of claim 13, wherein the shield support sleeve is arranged between the cable fixation sleeve and the finger protection assembly.

15. The electrical connector of claim 13, wherein the cable retention assembly has a sealing device arranged between the cable fixation sleeve and the shield support sleeve.

16. The electrical connector of claim 1, wherein the housing assembly includes a connector housing through which a receptacle for receiving the electrical cable extends along a mating direction.

17. The electrical connector of claim 16, wherein the connector housing has a rotationally asymmetric outer contour with respect to the mating direction.

18. The electrical connector of claim 17, wherein the rotationally asymmetric outer contour derives from at least one of a rotationally asymmetric locking feature, a rotationally asymmetric coding feature, a rotationally asymmetric grounding feature, and a rotationally asymmetrically arranged circuitry element.

* * * * *